US012485350B2

(12) United States Patent
Ohmori

(10) Patent No.: US 12,485,350 B2
(45) Date of Patent: Dec. 2, 2025

(54) STORAGE MEDIUM, INFORMATION PROCESSING SYSTEM, INFORMATION PROCESSING APPARATUS, AND GAME PROCESSING METHOD

(71) Applicants: Nintendo Co., Ltd., Kyoto (JP); The Pokémon Company, Tokyo (JP)

(72) Inventor: Shigeru Ohmori, Tokyo (JP)

(73) Assignees: Nintendo Co., Ltd., Kyoto (JP); The Pokémon Company, Tokyo (JP)

(*) Notice: Subject to any disclaimer, the term of this patent is extended or adjusted under 35 U.S.C. 154(b) by 360 days.

(21) Appl. No.: 18/176,812

(22) Filed: Mar. 1, 2023

(65) Prior Publication Data

US 2024/0033637 A1 Feb. 1, 2024

(30) Foreign Application Priority Data

Jul. 28, 2022 (JP) ................................ 2022-120469

(51) Int. Cl.
*A63F 13/58* (2014.01)
*A63F 13/822* (2014.01)

(52) U.S. Cl.
CPC ............ *A63F 13/58* (2014.09); *A63F 13/822* (2014.09)

(58) Field of Classification Search
CPC ....... A63F 13/58; A63F 13/822; A63F 13/422
See application file for complete search history.

(56) References Cited

U.S. PATENT DOCUMENTS

| | | | |
|---|---|---|---|
| 2005/0164794 A1 | 7/2005 | Tahara |
| 2007/0076015 A1 | 4/2007 | Tanabe et al. |
| 2008/0102950 A1 | 5/2008 | Ishii et al. |
| 2014/0357339 A1 | 12/2014 | Urushihara et al. |

(Continued)

FOREIGN PATENT DOCUMENTS

| | | |
|---|---|---|
| JP | 3946231 | 4/2007 |
| JP | 4213052 | 11/2008 |
| JP | 4319211 | 6/2009 |

(Continued)

OTHER PUBLICATIONS

"Mushiking: The King of the Beetles," Sega, 2003, https://web.archive.org/web/20170612192116/https://segaretro.org/Mushiking:_The_King_of_Beetles (Year: 2003).*

(Continued)

*Primary Examiner* — Kevin Y Kim
(74) *Attorney, Agent, or Firm* — Nixon & Vanderhye PC

(57) ABSTRACT

An example of an information processing system executes competitive game processing for causing a plurality of characters including a use character used by a player and an opponent character as an opponent of the use character to compete against each other in a virtual space. For each of the plurality of characters, at least a kind of the character, at least one first type associated with each kind of the character, a second type individually set with respect to each character, and categories of attacks which can be used by a character in a competition and with which a third type is associated are set. In the competitive game processing, the information processing system performs control to, in a case where a predetermined condition is satisfied, change a state of a character satisfying the condition from a first state to a second state.

24 Claims, 14 Drawing Sheets

(56) References Cited

U.S. PATENT DOCUMENTS

2020/0108319 A1 4/2020 Sakurai

FOREIGN PATENT DOCUMENTS

| | | |
|---|---|---|
| JP | 5457585 | 1/2014 |
| JP | 6527191 | 5/2019 |
| JP | 6768099 | 9/2020 |
| JP | 7034879 | 3/2022 |
| JP | 7161970 | 10/2022 |
| JP | 7241123 | 3/2023 |

OTHER PUBLICATIONS

"Mushiking: The King of Beetle," Sega, 2004, owner's manual (Year: 2004).*

"Sega NAOMI," Sega, 1998, https://segaretro.org/Sega_NAOMI (Year: 1998).*

"Pokemon RPGs 101", [online], The Pokémon Company, [searched on Jul. 18, 2022], internet https://www.pokemon.com/us/strategy/pokemon-rpgs-101/.

* cited by examiner

Fig.10

| | FIRST CHARACTER (NORMAL: A, TRANSFORMED: B) | | |
|---|---|---|---|
| | CHARACTER TYPE | ATTACK KIND (TYPE) | OFFENSIVE STRENGTH MAGNIFICATION |
| NORMAL STATE (A) | A | FIRST ATTACK (A) | 1.5 TIMES |
| | A | SECOND ATTACK (B) | 1 TIME |
| | A | THIRD ATTACK (C) | 1 TIME |
| | A | SPECIAL ATTACK (D) | 1 TIME |
| TRANSFORMED STATE (B) | A·B | FIRST ATTACK (A) | 1.5 TIMES |
| | A·B | SECOND ATTACK (B) | 1.5 TIMES |
| | A·B | THIRD ATTACK (C) | 1 TIME |
| | A·B | SPECIAL ATTACK (B) | 1.5 TIMES |

Fig.11

| | SECOND CHARACTER (NORMAL: A, TRANSFORMED: A) | | |
|---|---|---|---|
| | CHARACTER TYPE | ATTACK TYPE | OFFENSIVE STRENGTH MAGNIFICATION |
| NORMAL STATE (A) | A | FIRST ATTACK (A) | 1.5 TIMES |
| | A | SECOND ATTACK (B) | 1 TIME |
| | A | THIRD ATTACK (C) | 1 TIME |
| | A | SPECIAL ATTACK (D) | 1 TIME |
| TRANSFORMED STATE (A) | A·A | FIRST ATTACK (A) | 2 TIMES |
| | A·A | SECOND ATTACK (B) | 1 TIME |
| | A·A | THIRD ATTACK (C) | 1 TIME |
| | A·A | SPECIAL ATTACK (A) | 2 TIMES |

Fig.12

| | ATTACK TARGET CHARACTER (NORMAL: A, TRANSFORMED: B) | | |
|---|---|---|---|
| | ATTACK TARGET CHARACTER TYPE | ATTACK TYPE | DAMAGE |
| NORMAL STATE (A) | A | FIRST ATTACK (A) | 1 TIME |
| | A | SECOND ATTACK (B) | 0.5 TIMES |
| | A | THIRD ATTACK (C) | 2 TIMES |
| TRANSFORMED STATE (B) | B | FIRST ATTACK (A) | 2 TIMES |
| | B | SECOND ATTACK (B) | 1 TIME |
| | B | THIRD ATTACK (C) | 0.5 TIMES |

STORAGE MEDIUM, INFORMATION PROCESSING SYSTEM, INFORMATION PROCESSING APPARATUS, AND GAME PROCESSING METHOD

CROSS REFERENCE TO RELATED APPLICATION

This application claims priority to Japanese Patent Application No. 2022-120469, filed on Jul. 28, 2022, the entire contents of which are incorporated herein by reference.

FIELD

The present disclosure relates to a storage medium, an information processing system, an information processing apparatus, and a game processing method for executing a game where a plurality of characters compete against each other.

BACKGROUND AND SUMMARY

Conventionally, there is a technique for, in a game where a plurality of characters compete against each other, setting a type with respect to each kind of characters, and based on the types of the characters that compete against each other, for example, calculating damage from an attack.

In a competitive game based on a type set with respect to each kind of characters, an improvement in the level of strategy in the game or an increase in the variations of characters by creating tactics are desired.

Therefore, the present application discloses a storage medium, an information processing system, an information processing apparatus, and a game processing method capable of improving the level of strategy in a competitive game and increasing the variations of characters.

(1)

An example of a non-transitory computer-readable storage medium described herein a game program. The game program causes a processor of an information processing apparatus to: execute competitive game processing for causing a plurality of characters including a use character used by a player and an opponent character as an opponent of the use character to compete against each other in a virtual space. For each of the plurality of characters, at least: a kind of the character; at least one first type associated with each kind of the character; a second type individually set with respect to each character; categories of attacks which can be used by the character in a competition and with which a third type is associated, are set. The game program causes the processor to, in the competitive game processing: perform control to, in a case where a predetermined condition is satisfied, change a state of a character satisfying the condition from a first state to a second state; control the use character to, among the categories of the attacks that can be used by the use character, make an attack in a category indicated based on an operation input provided by the player, and calculate damage of the opponent character from the attack; based on an attack of the opponent character, calculate damage of the use character from the attack; in a case where the character having made the attack is in the first state, and in a case where the third type set for the made attack matches the first type set for the character having made the attack, increase damage from the attack compared to a case where the third type does not match the first type; in a case where the character having made the attack is in the second state, and in a case where the third type set for the made attack matches at least either of the first type and the second type set for the character having made the attack, increase damage from the attack compared to a case where the third type not match either of the first type and the second type; in a case where the character having received the attack is in the first state, and in a case where a combination of the third type set for the made attack and the first type set for the character having received the attack is a predetermined combination determined based on a predetermined rule, increase or decrease damage from the attack compared to a case where the combination is not the predetermined combination; and in a case where the character having received the attack is in the second state, and in a case where a combination of the third type set for the made attack and the second type set for the character having received the attack is a predetermined combination determined based on the predetermined rule, increase or decrease damage from the attack compared to a case where the combination is not the predetermined combination.

According to the configuration of the above (1), it is possible to create tactics for the selection of the timing when the state of a character is changed and the category of an attack to be made by the character. Thus, it is possible to improve the level of strategy in a competitive game. Two types are set for each character, whereby it is possible to increase the variations of characters.

(2)

In the configuration of the above (1), the game program may cause the processor to, in the competitive game processing: controls the use character and the opponent character to each perform a behavior once in each turn; and perform control to, in a case where the predetermined condition is satisfied in a certain turn, and before the use character and the opponent character each perform a behavior in the turn, change the state of the character satisfying the condition from the first state to the second state.

According to the configuration of the above (2), a first state changes from a second state before each character performs a behavior. Thus, the effect of the change is effectively exerted, and it is possible to further improve the level of strategy in the competitive game.

(3)

In the configuration of the above (2), the game program may cause the processor to, in the competitive game processing: perform control to, in accordance with an instruction based on an operation input provided by the player, change a state of the use character from the first state to the second state.

According to the configuration of the above (3), a player can change a use character from the first state to the second state at a desired timing.

(4)

In the configuration of the above (3), the competitive game processing may be competitive game processing for causing a plurality of the use characters and a plurality of the opponent characters to compete against each other. An instruction to change the use character from the first state to the second state may be received only once during a competition by the competitive game processing.

According to the configuration of the above (4), a limitation is placed on the number of times the use character is changed, whereby the player proceeds with a game taking into account the use character of which the state is changed and the timing when the use character is changed. Thus, it is possible to further improve the level of strategy in the competitive game.

(5)

In the configuration of the any one of above (1) to (4), the game program may cause the processor to, in the competitive game processing: in a case where the character having made the attack is in the second state, and in a case where the third type set for the made attack matches both the first type and the second type set for the character having made the attack, increase damage from the attack more than in a case where the third type matches only one of the first type and the second type.

According to the configuration of the above (5), regarding a character for which the same type as a first type is set as a second type, it is possible to create an advantage different from a character for which a different type from the first type is set as the second type. Thus, it is possible to make an advantage and a disadvantage less likely to occur between the first character and the second character.

(6)

In the configuration of the any one of above (1) to (5), the game program may further cause the processor to, in the competitive game processing: perform control to, in a case where the character changes from the first state to the second state, change the third type of an attack in a predetermined category among the categories of the attacks set for the character to a type that matches the second type.

According to the configuration of the above (6), a character having changed from a first state to a second state can make an effective attack taking advantage of the change by an attack in the above predetermined category.

The present specification discloses examples of an information processing apparatus and an information processing system that execute the processes in the above (1) to (6). The present specification also discloses an example of a game processing method that executes the processes in the above (1) to (6).

According to the above storage medium, information processing system, information processing apparatus, or game processing method, it is possible to improve the level of strategy in a competitive game and increase the variations of characters.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 10 is a diagram showing an example of the offensive strength of each attack category in a case where a first character is in a normal state and in a case where the first character is in a transformed state;

FIG. 11 is a diagram showing an example of the offensive strength of each attack category in a case where a second character is in the normal state and in a case where the second character is in the transformed state;

FIG. 12 is a diagram showing an example of damage to be received from an attack in the normal state and the transformed state of a character;

DETAILED DESCRIPTION OF NON-LIMITING EXAMPLE EMBODIMENTS

[1. Configuration of Game System]

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
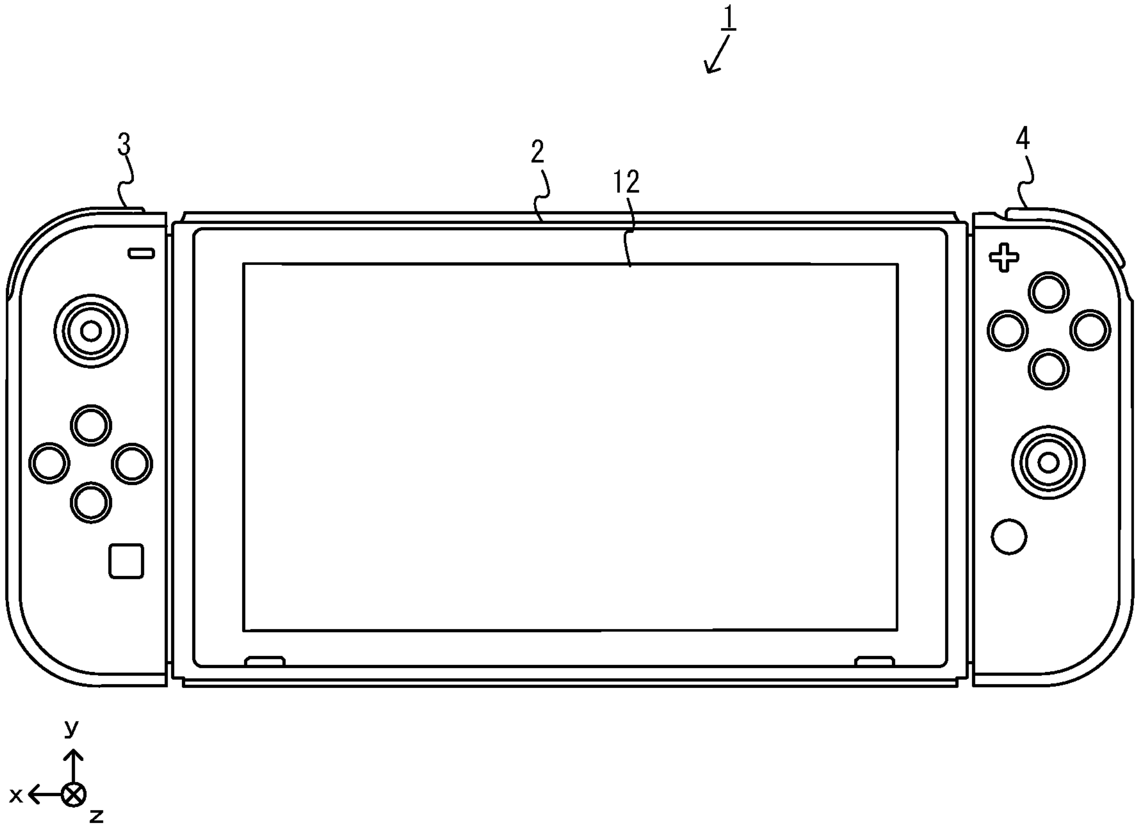
FIG. 1 is a view showing an example where a non-limiting left controller and a non-limiting right controller are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
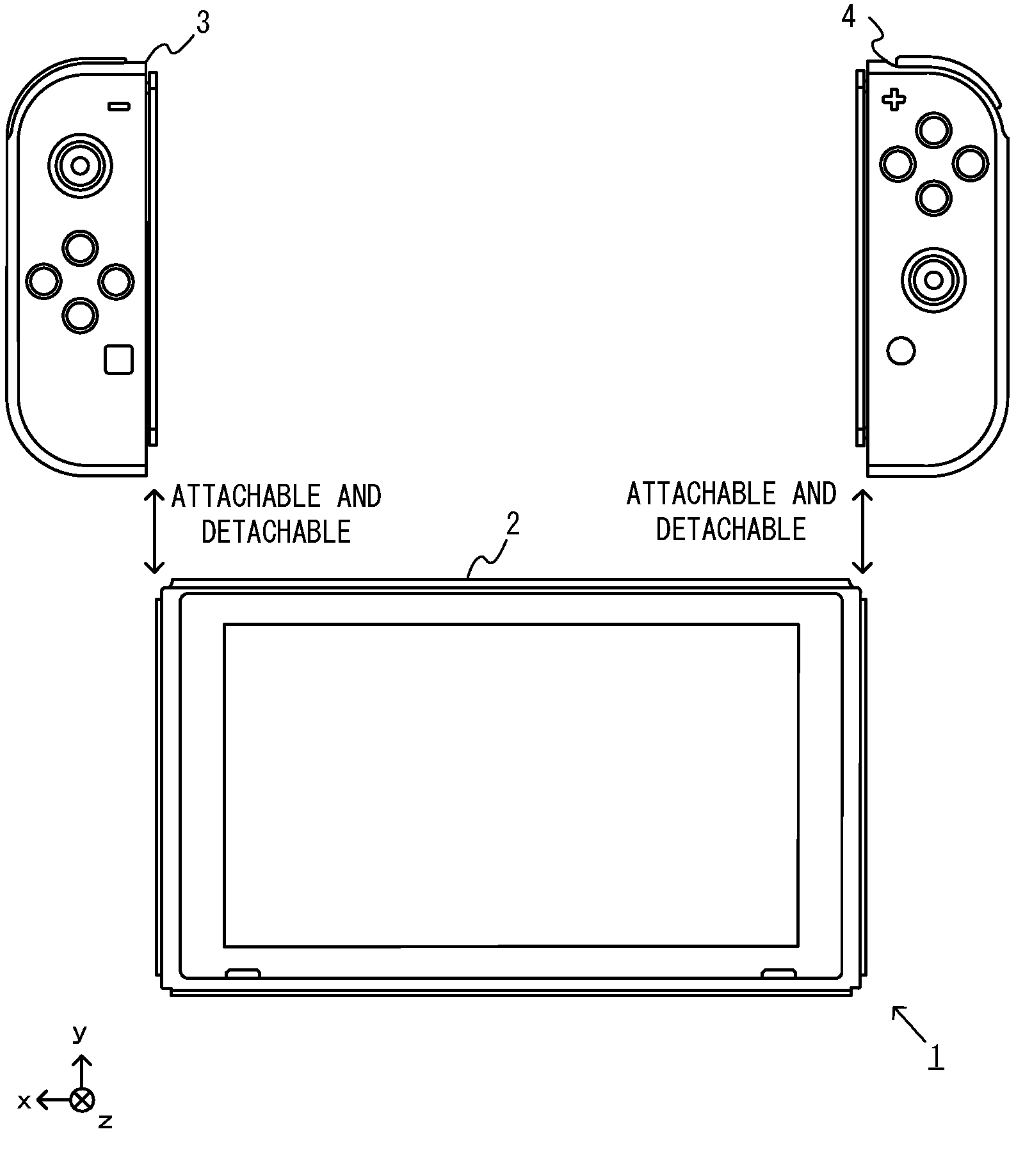
FIG. 2 is a view showing an example where a non-limiting left controller and a non-limiting right controller are removed from a non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
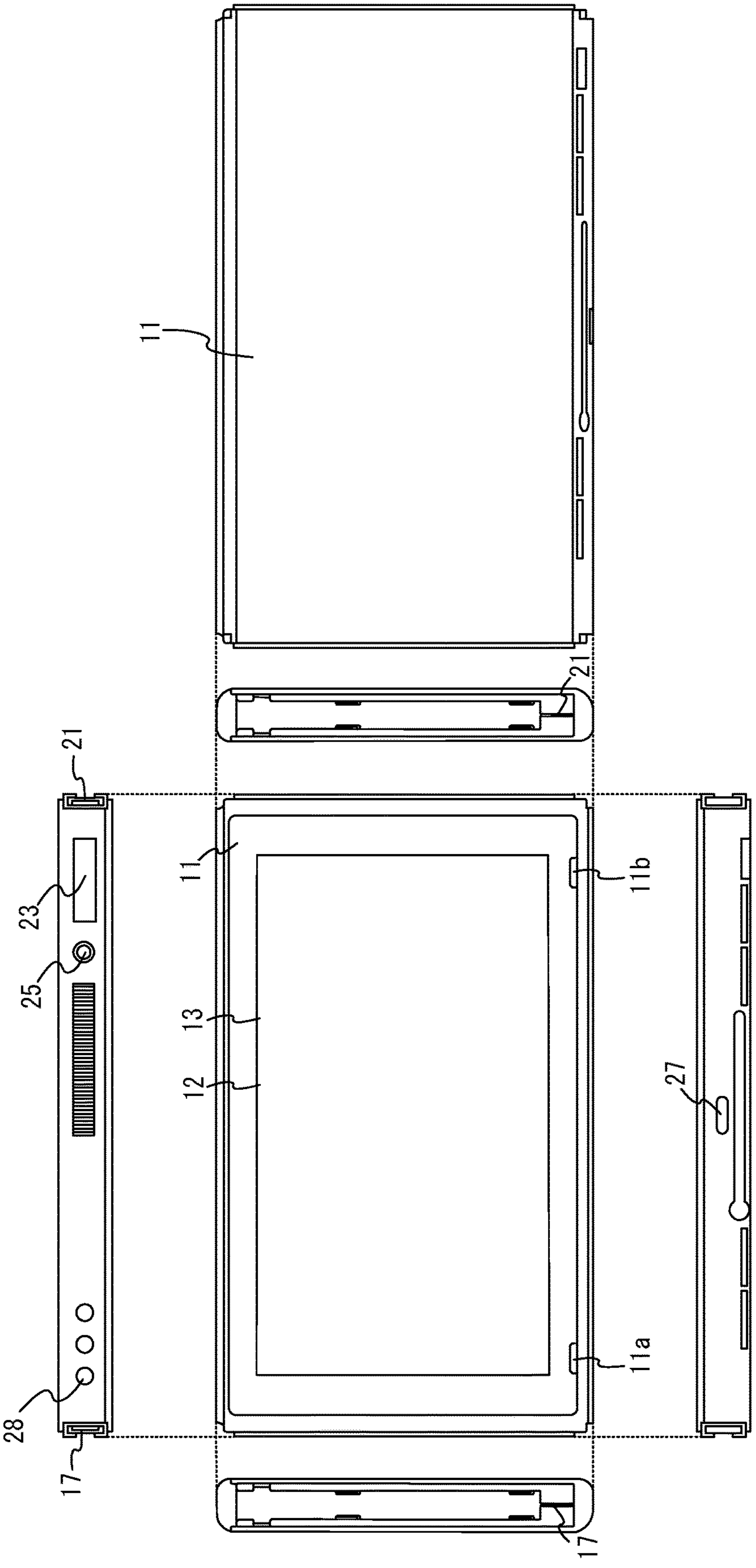
FIG. 3 is a six-sided view showing an example of a non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11*a* and 11*b* are formed on the main surface of the housing 11. Then, sounds output from the speakers 88 are output through the speaker holes 11*a* and 11*b*.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
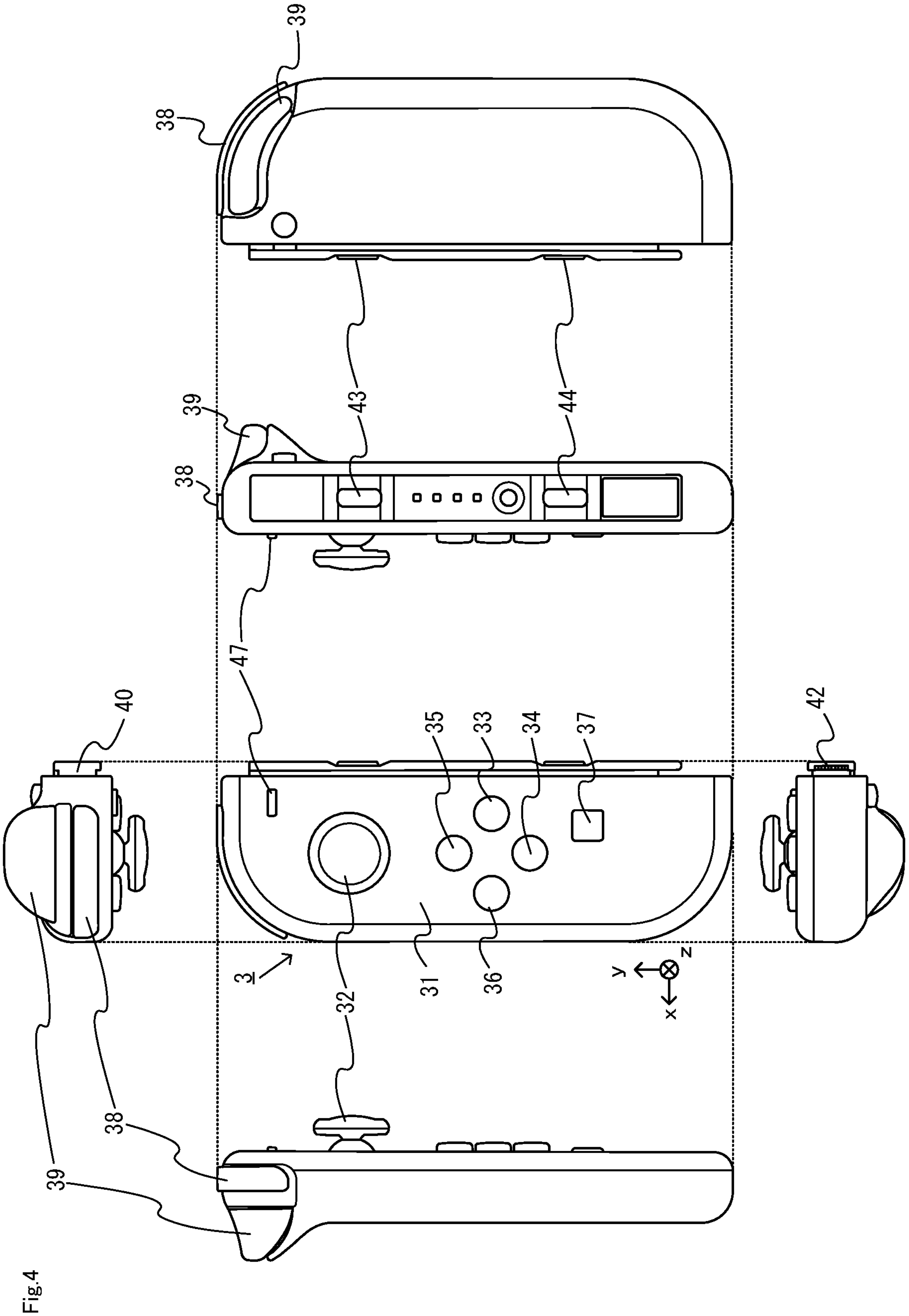
FIG. 4 is a six-sided view showing an example of a non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a"–" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
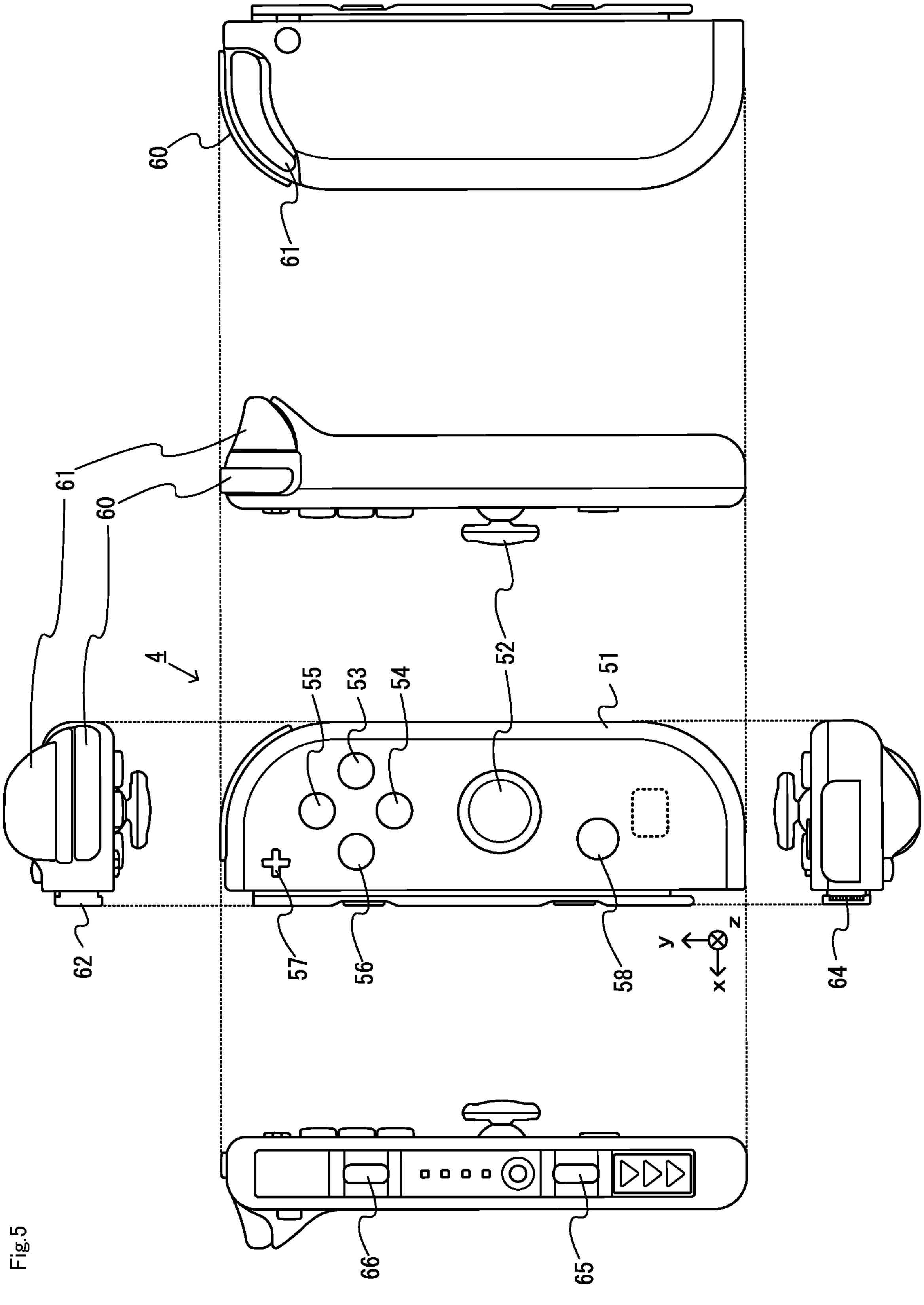
FIG. 5 is a six-sided view showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a"+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
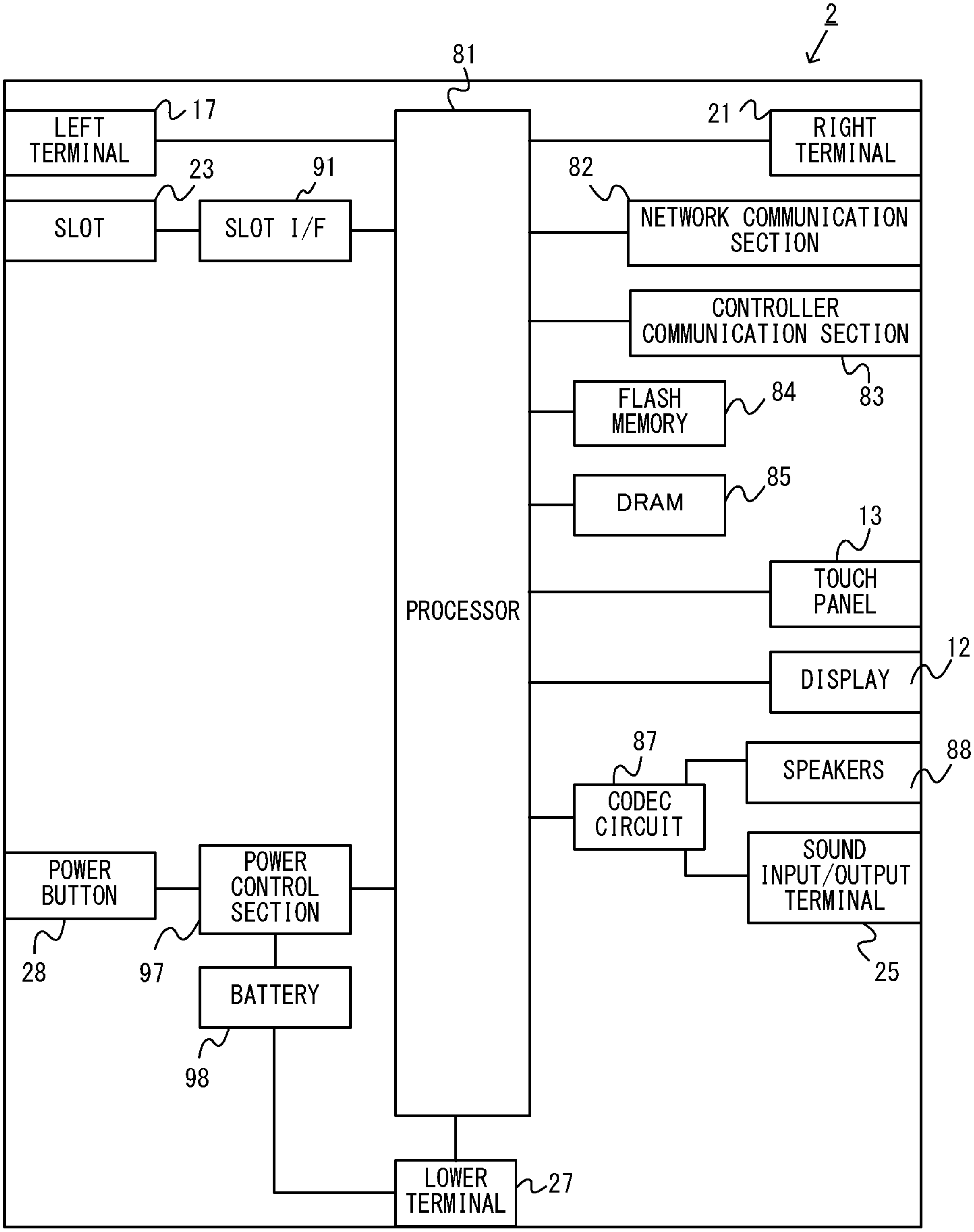
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81 to 85, 87, 88, 91, 97, and 98 shown in FIG. 6 in addition to the components shown in FIG. 3. Some of the components 81 to 85, 87, 88, 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2

(specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
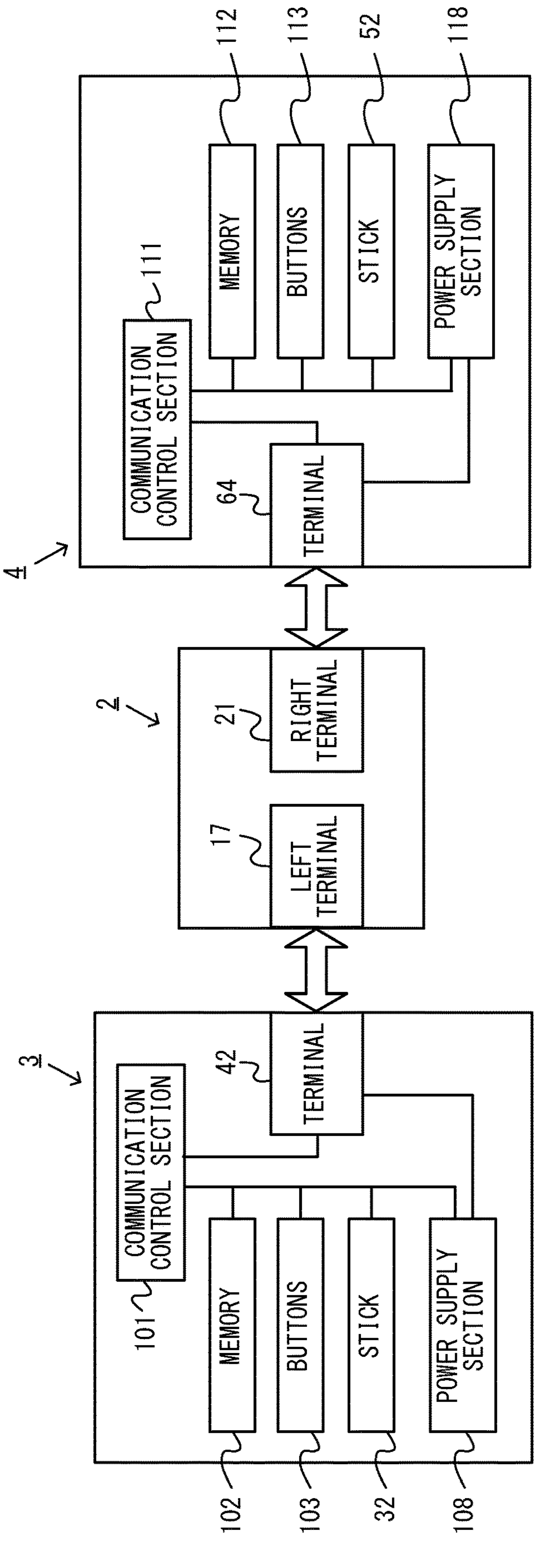
FIG. 7 is a block diagram showing an example of an internal configuration of a non-limiting main body apparatus, a non-limiting left controller and a non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103 and the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113 and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[2. Overview of Processing in Game System]

Next, with reference to FIGS. 8 to 12, an overview of processing executed by the game system 1 is described. In the exemplary embodiment, the game system 1 executes a game including a competition scene where a character that can be operated by a player (i.e., a user of the game system 1) competes against an enemy character.

Figure 8:
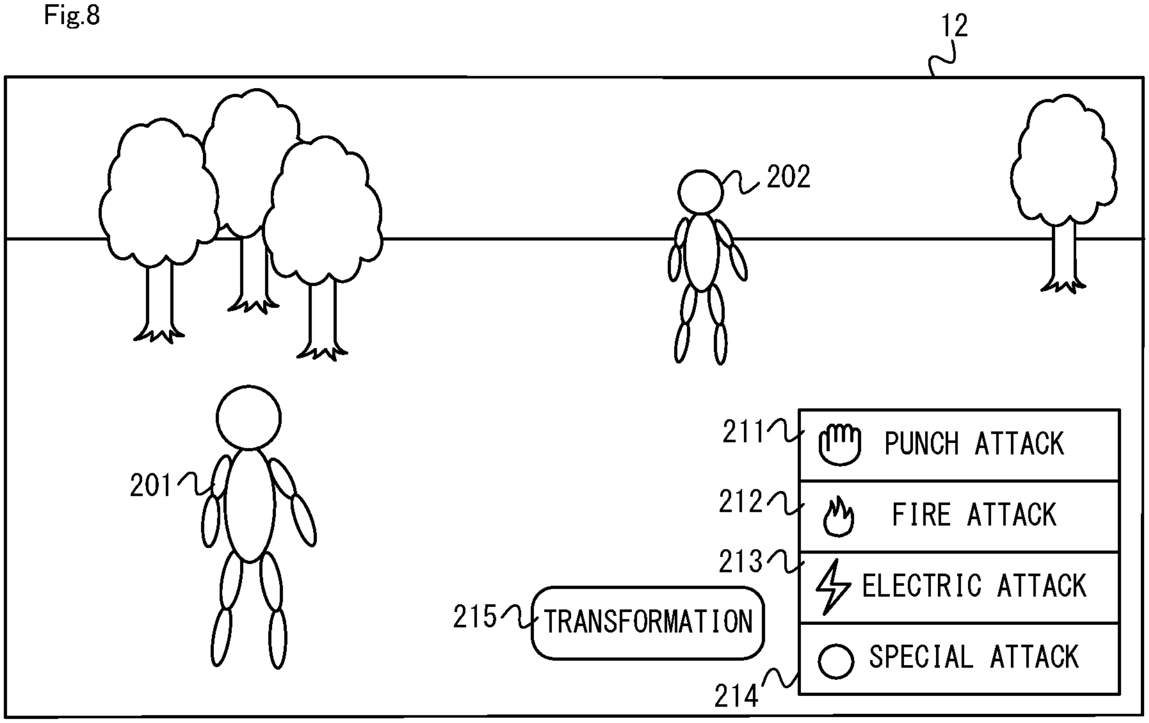
FIG. 8 is a diagram showing an example of a game image displayed in a competition scene.

FIG. 8 is a diagram showing an example of a game image displayed in a competition scene. As shown in FIG. 8, in the competition scene, a game image representing the state where a use character 201 and an opponent character 202 are placed in a game space is displayed on the display 12. The use character 201 is a character used by the player (i.e., operated by the player). The opponent character 202 is a character as an opponent of the use character 201. The opponent character 202 may be a character operated by another player, or may be a character of which the behavior is controlled by the game system 1. Although a single use character and a single opponent character are present in the example shown in FIG. 8, a plurality of use characters may appear or a plurality of opponent characters may appear in the competition scene. During a single competition, a character as a use character may be changed (or switched) by, for example, an instruction from the player, or a character as an opponent character may also be able to be changed.

In the exemplary embodiment, a so-called turn-based competition is held in the competition scene. That is, in a single turn, after the player determines the behavior content of the use character 201, and the behavior content of the opponent character 202 is determined, the characters 201 and 202 each perform a behavior. Then, the above turn is repeatedly performed until the competition ends, whereby the competitive game progresses. In another exemplary embodiment, in the competition scene, not only a turn-based competitive game but also a real-time competitive game where each character sequentially performs a behavior in accordance with the lapse of time may be performed.

Here, in the exemplary embodiment, for each character capable of appearing in the competition scene, a type is set. A "type" is a thing such as water, fire, or thunder and is also referred to as an "attribute". For a single character, some of types of a plurality of kinds are set. A relationship indicating an advantage or a disadvantage is set between types such that, for example, the water type has an advantage over the fire type and has a disadvantage over the thunder type. That is, as a combination of two types, there are a combination in which one type has an advantage over the other type, a combination in which one type has a disadvantage over the other type, and a combination in which one type has an average relationship with the other type.

As shown in FIG. 8, the game image in the competition scene includes attack instruction images 211 to 214. The attack instruction images 211 to 214 indicate the categories of attacks that can be used by the use character 201. The attack instruction images 211 to 214 are images for the player to indicate the categories of attacks that the player is to cause the use character 201 to make. That is, the player specifies one of the attack instruction images 211 to 214 (e.g., in the state where a single desired attack instruction image is selected, the player performs the operation of specifying the attack instruction image), thereby indicating the category of an attack that the player is to cause the use character 201 to make.

As described above, in the exemplary embodiment, for a character, the categories of attacks that can be used by the character are set. In the exemplary embodiment, for a single character, the categories of one or more attacks can be set up to a predetermined number (e.g., 4) as the categories of attacks that can be used. A method for the player to set for a use character the categories of attacks that can be used by the use character is any method. For example, the categories of attacks that can be set for use characters may be determined with respect to each kind of use characters, and in a scene other than the competition scene during the game, the player may select, among these categories that can be set, the categories of attacks that can be used by a use character.

In the exemplary embodiment, also for the above attacks to be made by a character, any of types of the same kinds as those set for the character (i.e., types such as water, fire, and thunder) are set. In the exemplary embodiment, a single type is associated with an attack in a single category. As shown in FIG. 8, the attack instruction images 211 to 214 each include a name indicating the category of an attack (a punch attack, a flame attack, or the like in the example shown in FIG. 8) and a mark indicating the type of the attack (a fist mark, a fire mark, or the like in the example shown in FIG. 8).

The type of a character and the type of an attack that can be used by the character do not need to be the same as each other (e.g., the type of the character and the type of the attack both do not need to be water). As described above, in accordance with the kind of a character, the categories of attacks that can be set for the character are determined. Thus, while it is not that an attack in any category can be set for any character, for a character, an attack of a type of the same kind as the type of the character can be set, or an attack of a type of a different kind from the type of the character can be set.

In the competition scene, the game system 1 causes the use character 201 to make an attack in a category specified by the player. Here, damage to be inflicted on an attack target character by the above attack is determined by increasing or decreasing damage based on an offensive strength set with respect to each attack and a defense-related parameter (e.g., a defensive strength) of a character having received an attack, based on the type of each character and the type of the attack. Although the details will be described below, in a case where the type of a character that makes an attack and the type of the attack match each other (e.g., in a case where the type of the character is water, and the type of the attack is also water), the offensive strength of the attack increases more than in a case where the types do not match each other. As a result, damage to be inflicted on a character that receives the attack also increases. For example, in a case where the type of a made attack has an advantage over the type of a character that receives the attack, damage to be inflicted on the character that receives the attack increases compared to a case where the type of the attack has an average relationship with the type of the character. On the other hand, in a case where the type of a made attack has a disadvantage over the type of a character that receives the attack, damage to be inflicted on the character that receives the attack decreases compared to a case where the type of the attack has an average relationship with the type of the character. Further, in the case of a particular combination having a special disadvantage, damage to be inflicted on a character that receives an attack is invalidated. In a case where two types are set for a character that receives an attack, and the type of the attack has an advantage over both types, damage further increases. In a case where the type of the attack has a disadvantage over both types, the damage further decreases. In a case where the type of the attack has an advantage over one of the types, and the type of the attack has a disadvantage over the other type, the damage does not increase or decrease.

As described above, in the exemplary embodiment, types are set for each character and each attack. Based on these types, damage is calculated. For example, taking into account the type of a character that makes an attack and the type of the attack, and also taking into account the advantage/disadvantage relationship between the type of the attack and the type of an attack target character, the player selects the category of the attack. Thus, it is possible to cause the player to perform a strategic competitive game.

In the competition scene, behaviors that can be performed by each character are not limited to attack actions, and may be actions other than the attack actions. For example, as actions that can be used by the use character 201, an action of strengthening the use character 201 itself, an action of weakening an opponent character, or an action of recovering the hit point of the use character 201 itself may be set. For example, instead of some of the attack instruction images 211 to 214 shown in FIG. 8, instruction images indicating actions other than attack actions may be displayed. In the exemplary embodiment, as an example, a case is described where for a use character and an opponent character, only the categories of attack actions are set as actions that can be used.

Here, in the exemplary embodiment, each character can transform. For each character, two types, namely a normal type and a transformed type, are set. The normal type is a type applied to a character at least in the state before the transformation (referred to as a "normal state"). The transformed type is a type applied to a character in the state after the transformation (referred to as a "transformed state"). Although the details will be described below, in the exemplary embodiment, in a case where a character is in the normal state, the game system 1 performs a damage calculation process by applying the normal type of the character and without applying the transformed type, and in a case where a character is in the transformed state, the game system 1 performs a damage calculation process by applying the normal type and the transformed type of the character.

In the exemplary embodiment, a normal type is set with respect to each kind of characters. A transformed type is set with respect to each character. Thus, regarding a plurality of characters of the same kind, the normal types of all the characters are the same as each other, but the transformed types of the characters may be different from each other. The transformed type of a character may be the same as the normal type of the character, or may be different from the normal type of the character. In the exemplary embodiment, regarding a single character, normal types of a plurality of kinds (e.g., the water and fire types) may be set. On the other hand, regarding a single character, only a single transformed type is set. In another exemplary embodiment, however, regarding a single character, transformed types of a plurality of kinds may be set.

As shown in FIG. 8, the game image in the competition scene includes a transformation instruction image 215. The transformation instruction image 215 is an image for the player to give a transformation instruction to transform the use character 201. That is, the player specifies the transformation instruction image 215 and thereby can transform the use character 201. For example, in the state where a transformation instruction image is selected, the player performs the operation of specifying the transformation instruction image and thereby can give a transformation instruction.

Figure 9:
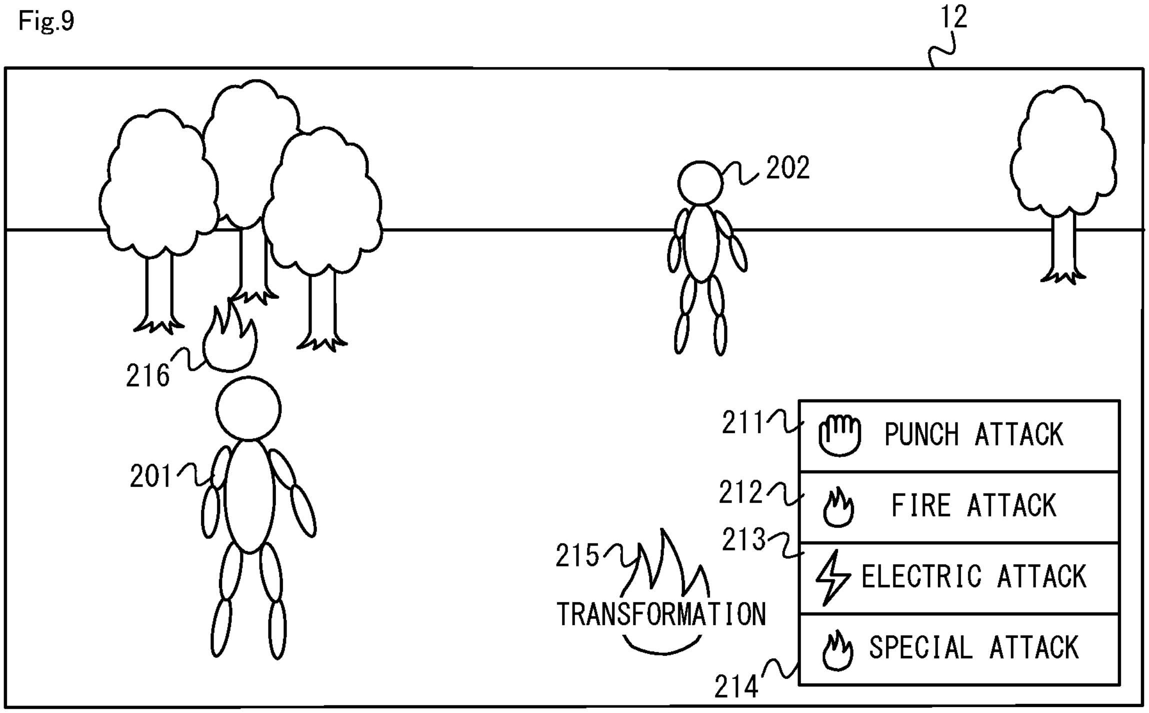
FIG. 9 is a diagram showing an example of a game image in a case where a transformation instruction image is specified.

FIG. 9 is a diagram showing an example of a game image in a case where a transformation instruction image is specified. As shown in FIG. 9, in the state where the transformation instruction image 215 is specified, the transformation instruction image 215 changes to indicate the transformed type of the use character 201 (the transformation instruction image 215 changes to an image representing fire in the example shown in FIG. 9). This can cause the player to recognize the type (i.e., the transformed type) of the use character 201 after the transformation.

In the exemplary embodiment, in a case where an opponent character is in the normal state (i.e., before the opponent character transforms), the game system 1 does not perform display indicating the transformed type of the opponent character. That is, the player cannot know the transformed type of the opponent character before the transformation of the opponent character. This is to create more tactics regarding a competition and improve the level of strategy in the competitive game.

In the exemplary embodiment, each character can make a special attack in which the type of the attack can change before and after the transformation of the character. In the examples shown in FIGS. 8 and 9, the attack instruction image 214 indicates the above special attack. The special attack is an attack set to, in a case where a character is in the normal state, a predetermined type (a type indicated by a circular mark in the example shown in FIG. 8), and set to, in a case where a character is in the transformed state, the same type as the transformed type of the character (i.e., the type changes). In the exemplary embodiment, the above special attack can be set as an attack that can be used regarding characters of all kinds. The influence of a change in the type of the special attack in accordance with the transformation of a character will be described below.

As shown in FIG. 9, in the state where the transformation instruction image 215 is specified, the mark indicating the type included in the attack instruction image 214 indicating the special attack also changes. For example, in the examples shown in FIGS. 8 and 9, the mark included in the attack instruction image 214 changes to indicate the fire type in accordance with the specifying of the transformation instruction image 215. This can cause the player to recognize that the type of the special attack changes when the use character 201 transforms, and the type after the change.

When the player provides an operation input for determining a behavior in a turn in the state where a transformation instruction is given (i.e., the transformation instruction image 215 is specified) as described above, the game system 1 transforms the use character 201 before each character performs a behavior. In the exemplary embodiment, in a case where the use character 201 transforms, the external appearance of the use character 201 changes. Specifically, the use character 201 in the transformed state changes to a display form suggesting the transformed type. For example, in a case where the transformed type of the use character 201 is the fire type, a mark 216 representing fire may be attached to the use character 201 in the transformed state (see FIG. 9), or a part of the shape of the use character 201 itself may have a shape representing fire, or the use character 201 may change to a display form in which an effect image representing fire is attached to the use character 201. In FIG. 9, the display form of the use character 201 changes at a time before the player determines the behavior in the turn. Alternately, the display form of the use character 201 may change after the player determines the behavior in the turn (i.e., after it is determined that the use character 201 is to transform). Also in a case where the opponent character 202 enters the transformed state similarly to the use character 201, the opponent character 202 changes to a display form suggesting the transformed type. The above process can cause the player to recognize that a character transforms, and the type after the transformation (i.e., the transformed type).

In a case where a character makes an attack, the game system 1 causes the character to perform an action according to the category of the attack and also displays an effect image relating to the category of the attack in accordance with the action. Here, in the exemplary embodiment, in a case where an attack of the same type as the transformed type of a character in the transformed state is performed by the character, the game system 1 differentiates an effect image of the attack from an effect image in a case where the character is not in the transformed state. For example, the effect image of the above attack made by a character in the transformed state may be an effect image showier than the effect image in a case where the character is not in the transformed state. Although the details will be described below, in a case where an attack of the same type as the transformed type of a character in the transformed state is performed by the character, the offensive strength increases compared to a case where an attack of a different type is performed by the character. Thus, an effect image as described above is displayed, whereby it is possible to cause the player to recognize in an easily understandable manner that a powerful attack with an increased offensive strength is performed.

As described above, in the exemplary embodiment, each character can transform during a competition. Although the details will be described below, a character transforms, whereby, regarding an attack to be made by the character and an attack to be received by the character, damage (from the attacks) calculated based on types changes. For example, the player transforms the use character 201 at an appropriate timing and thereby can increase damage from an attack of the use character 201 or decrease damage from an attack of the opponent character 202. That is, it is possible to improve the level of strategy in a competition by the transformation of a character.

Next, with reference to FIGS. 10 to 12, specific examples of the effects of attacks in the normal state and the transformed state of a character are described. FIG. 10 is a diagram showing an example of the offensive strength of each attack category in a case where a first character is in the normal state and in a case where the first character is in the transformed state. In the example shown in FIG. 10, the normal type of the first character is A, and the transformed type of the first character is B. The first character can use attacks in four categories, namely a first attack of which the type is A, a second attack of which the type is B, a third attack of which the type is C, and the above special attack. The type of the special attack in the normal state is D.

In the exemplary embodiment, in a case where an attack character type that is the type of a character that makes an attack and the type of an attack to be made by the character match each other, the game system 1 increases the offensive strength magnification of the attack compared to a reference value. Specifically, in the above case, the offensive strength magnification is set to 1.5 times. On the other hand, in a case where the attack character type and the type of the attack to be made by the character do not match each other, the offensive strength magnification is set to the reference value (i.e., 1 time). The offensive strength of the above attack is calculated based on the result of multiplying a value, which is set with respect to each category of an attack and indicates the power of the attack, by the above offensive strength magnification. The method for calculating the above offensive strength is any method. For example, the offensive strength may be calculated based further on a parameter set for the character that makes the attack (e.g., a parameter indicating a force) in addition to the above multiplication result.

In a case where the first character is in the normal state, the offensive strength magnification is calculated on the assumption that the attack character type of the first character is the normal type. Thus, in a case where the first character is in the normal state in the example shown in FIG. 10, the attack character type of the first character is A. Thus, regarding the first attack of which the type is A, the offensive strength magnification is set to 1.5 times. On the other hand, regarding the second attack, the third attack, and the special attack of which the types are other than A, the offensive strength magnifications are set to the reference value (i.e., 1 time).

Damage to be received by an attack target character from the above attack is calculated based on the above offensive strength. Although the details will be described below, the damage to be received by the attack target character is calculated based on the above offensive strength and the advantage/disadvantage relationship between the type of the attack and the type of the character.

In a case where the first character is in the transformed state, the offensive strength is calculated based on both the normal type and the transformed type as the attack character type of the first character. That is, in a case where the normal type or the transformed type of a character and the type of an attack to be made by the character match each other, the game system 1 increases the offensive strength magnification of the attack compared to the reference value. Thus, in a case where the first character is in the transformed state in the example shown in FIG. 10, regarding the first attack of which the type matches the normal type (i.e., the type A) of the first character and the second attack and the special attack of which the types match the transformed type (i.e., the type B) of the first character, the offensive strength magnifications are set to 1.5 times. As described above, regarding the special attack, the type changes in accordance with the fact that the first character enters the transformed state, thereby changing to a type that matches the transformed type. Thus, the offensive strength magnification is set to 1.5 times. On the other hand, regarding the third attack of which the type does not match either of the normal type and the transformed type of the first character, the offensive strength magnification is set to the reference value.

As described above, regarding the first character, in the normal state before the transformation, the offensive strength of only the first attack increases more than usual, whereas, in the transformed state, the offensive strengths of also the second attack and the special attack in addition to the first attack increase more than usual. Thus, it can be said that the first character transforms, thereby becoming likely to make a more powerful attack.

As described above, there can also be a case where a normal type and a transformed type set for a character are the same as each other. FIG. 11 is a diagram showing an example of the offensive strength of each attack category in a case where a second character is in the normal state and in a case where the second character is in the transformed state. In the example shown in FIG. 11, the normal type and the transformed type of the second character are both A. The second character can use the first to third attacks and the special attack that are the same as those of the first character.

In the example shown in FIG. 11, the offensive strength in a case where the second character is in the normal state is calculated similarly to the offensive strength in a case where the first character is in the normal state. On the other hand, in a case where the second character is in the transformed state, the game system 1 calculates the offensive strength based on both the normal type and the transformed type as the attack character type of the second character. That is, in a case where the type of an attack to be made by a character matches both the normal type and the transformed type of the character, the game system 1 increases the offensive strength magnification of the attack compared to a case where the type of the attack matches only either one of the normal type and the transformed type of the character (see FIG. 10). In the example of FIG. 11, in the above case, the offensive strength magnification is set to 2 times. Thus, in a case where the second character is in the transformed state, regarding the first attack and the special attack of which the types match both the normal type and the transformed type of the second character, the offensive strength magnifications are set to 2 times. In a case where the second character is in the transformed state, regarding the second attack and the third attack of which the types do not match either of the normal type and the transformed type of the second character, the offensive strength magnifications are set to the reference value (i.e., 1 time).

As described above, in the exemplary embodiment, in a case where a character having made an attack is in the transformed state, and in a case where a type set for the made attack matches both a normal type and a transformed type set for the character having made the attack, the game system 1 increases damage from the attack more than in a case where the type of the attack matches only one of the normal type and the transformed type of for the character. Based on this, a character for which the same type as the normal type is set as the transformed type (e.g., the above second character) can make an attack with an offensive strength greater than a character for which a different type from the normal type is set as the transformed type (e.g., the above first character). On the other hand, a character for which a different type from the normal type is set as the transformed type can make an attack with an offensive strength greater than the reference value regarding attacks in more categories than a character for which the same type as the normal type is set as the transformed type. As described above, based on the above, no matter what transformed type is set for a character, it is possible to create the advantage of the transformed type in the character, and it is possible to make an advantage and a disadvantage less likely to occur between characters of which the transformed types are different from each other. Different advantages are created between a character for which the same type as the normal type is set as the transformed type and a character for which a different type from the normal type is set as the transformed type, whereby it is possible to improve the level of strategy in the game.

FIG. 12 is a diagram showing an example of damage to be received from an attack in the normal state and the transformed state of a character. In the example shown in FIG. 12, the normal type of an attack target character (i.e., a character that receives an attack) is A, and the transformed type of the attack target character is B. The example shown in FIG. 12 shows damage in a case where the attack target character receives any of the first attack of which the type is A, the second attack of which the type is B, and the third attack of which the type is C. In the example shown in FIG. 12, the attack of the type A has an average relationship with the attack target character of which the type is A, the attack of the type B has a disadvantage over the attack target character of which the type is A, and the attack of the type C has an advantage over the attack target character of which the type is A. The attack of the type A has an advantage over the attack target character of which the type is B, the attack of the type B has an average relationship with the attack target character of which the type is B, and the attack of the type C has a disadvantage over the attack target character of which the type is B.

In the exemplary embodiment, in a case where the type of an attack has an advantage over the type of the attack target character, damage to be received by the attack target character is 2 times as much as a reference damage value. The reference damage value is the value of damage to be received by the attack target character in a case where the above advantage/disadvantage relationship is average. The reference damage value is calculated based on the above offensive strength. More specifically, the reference damage value is calculated based on this offensive strength and a parameter (e.g., a parameter indicating a defensive strength) set for the attack target character.

In a case where the attack target character is in the normal state, the damage is calculated on the assumption that the type of the attack target character is the normal type. In the example shown in FIG. 12, in a case where the attack target character is in the normal state, the normal type of the attack target character is A. Thus, regarding the first attack, the type of the attack has an average relationship with the type of the attack target character, and therefore, the damage is the reference damage value. The second attack has a disadvantage over the type of the attack target character, and therefore, the damage is 0.5 times as much as the reference damage value. The third attack has an advantage over the type of the attack target character, and therefore, the damage is 2 times as much as the reference damage value.

On the other hand, in a case where the attack target character is in the transformed state, the damage is calculated on the assumption that the type of the attack target character is the transformed type. In the example shown in FIG. 12, in a case where the attack target character is in the transformed state, the transformed type of the attack target character is B. Thus, regarding the first attack, the type of the attack has an advantage over the type of the attack target character, and therefore, the damage is 2 times as much as the reference damage value. The second attack has an average relationship with the type of the attack target character, and therefore, the damage is the reference damage value. The third attack has a disadvantage over the type of the attack target character, and therefore, the damage is 0.5 times as much as the reference damage value. As described above, the category of an effective attack differs depending on whether the attack target character is in the normal state or in the transformed state. Even in the case of the same attack, the damage to be received by the attack target character differs.

In addition to the above, for example, in a case where a combination of types having an advantage/disadvantage relationship that invalidates damage is set, the attack target character can invalidate attacks of different types before and after the transformation. In a case where two kinds of normal types are set for the attack target character, and when the attack target character receives an attack of a type having an advantage over both two kinds of normal types, the attack target character receives damage 4 times as much as a case where the advantage/disadvantage relationship is average. Regarding this, in the exemplary embodiment, a transformed type set for a character is a single kind, and therefore, the attack target character transforms and thereby can avoid receiving the above damage as much as 4 times, no matter what the type of the attack is.

As described above, in the exemplary embodiment, a character is brought into the transformed state, whereby it is possible to increase the offensive strength of an attack of a particular type or change damage in a case where the character receives an attack. For example, as shown in the example shown in FIG. 12, in a case where the player operates a certain use character of which the normal type is A and the transformed type is B, and in a case where an opponent character is expected to make an attack which has an advantage over the use character and of which the type is C, the player changes the type by transforming the use character and thereby can decrease damage from the attack of which the type is C. Further, at this time, the player causes the use character to make an attack of which the type is B, whereby it is possible to cause the use character to make an attack with a great offensive strength. As described above, a character is brought into the transformed state at an appropriate timing in the competition scene, whereby it is easy to advantageously proceed with the competition. An opponent character can also transform, and therefore, the player performs the game while considering an effective attack by expecting whether or not the opponent character is to transform. For example, even when an attack of a type has a disadvantage over the opponent character in the normal state, but the attack of the type has an advantage over the opponent character in the transformed state, it is also possible that the player expects the opponent character to transform, and purposely causes the opponent character to make the attack. As described above, a transformed type is set for a character so that the character can transform in the competition scene, whereby it is possible to improve the level of strategy in the competitive game.

In the exemplary embodiment, the kind of a transformed type is set with respect to each character. Thus, a different transformed type may be set for a character of the same kind. This can make it easy to provide individuality to each character and vary characters.

Regarding characters in the exemplary embodiment, the player may be able to collect the characters by catching the characters during the game. Here, in the exemplary embodiment, there are many characters of the same kind but of different transformed types. This can provide the player with a motivation to collect many characters. Even a character for which a type that tends to be disadvantageous in the game is set as the normal type can create a new use method or strategy based on the transformed type. The transformed type of a caught character may be randomly determined when the character appears or is captured. In a particular scene, a character of a transformed type set in advance may appear. Based on the above, it is possible to increase variations of character collection factors.

In the exemplary embodiment, a turn-based competition is held, and a use character and an opponent character transform before each character performs a behavior (i.e., a behavior such as an attack) at the start of a turn. That is, the game system 1 performs control so that the use character and the opponent character each perform a behavior once in each turn, and in a case where a predetermined condition is satisfied in a certain turn (i.e., in a case where a transformation instruction is given by the player), performs control to change the state of a character satisfying the condition from the normal state to the transformed state before the use character and the opponent character each perform a behavior in the certain turn. Based on this, the player instructs a character operated by the player themselves to perform a behavior in the state where the player does not know whether or not a character as an opponent is to transform, and (in a case where the opponent character is to transform) the character transforms before the behavior is performed. This effectively exerts the effect of the transformation. Thus, it is possible to further improve the level of strategy in the competitive game.

In the exemplary embodiment, a condition for the transformation of the use character is that the player gives a transformation instruction. That is, in accordance with an instruction based on an operation input provided by the player, the game system 1 performs control to change the state of the use character from the normal state to the transformed state. Based on this, the player can transform the use character at a desired timing. In the exemplary embodiment, in a case where the opponent character is operated by another player, a condition for the transformation of the opponent character is that the other player gives a transformation instruction.

In another exemplary embodiment, the condition for the transformation of the use character is any condition, and may be another condition. For example, the condition for the transformation may be that the hit point of the use character becomes less than or equal to a predetermined value, or that the use character uses a predetermined item, or that a predetermined time elapses from a predetermined timing (e.g., the timing when the competition starts). In a case where a gauge that is accumulated by, for example, making an attack or receiving an attack is set during the competition, the condition for the transformation may be that the amount of the gauge reaches the maximum. Opponent characters may include an opponent character that enters the transformed state under the condition that the competition scene is started (i.e., enters the transformed state at the start of the competition).

In the exemplary embodiment, the number of times a use character can transform in a single competition scene is once. Thus, in a case where a plurality of use characters appear in a competition scene, a single use character among the plurality of use characters can transform, and after a certain use character transforms, another use character cannot transform. "A case where a plurality of use characters appear in a competition scene" means both a case where a plurality of use characters simultaneously appear in a single competition scene and a case where a plurality of characters appear by switching a character as a use character. That is, in the exemplary embodiment, an instruction to change a use character from the normal state to the transformed state (i.e., the above transformation instruction) is received only once during a competition. Based on the above, the player cannot transform a plurality of use characters many times, and therefore needs to give a transformation instruction by finding out a use character to transform and an appropriate timing when the use character is to transform. This can further improve the level of strategy in the competitive game. In the exemplary embodiment, also regarding an opponent character, similarly to a use character, the number of times the opponent character can transform is once.

In another exemplary embodiment, the number of times a use character can transform may be set to any number. For example, the game system 1 may set the above number of times to multiple times (e.g., three times). In a case where a plurality of use characters appear, the player may transform each character a predetermined number of times (e.g., once). The above number of times may not be limited.

In a case where a use character transforms, in accordance with the satisfaction of a predetermined recovery condition outside a battle scene, the game system 1 may bring the use character into the state where the use character can transform again. The recovery condition may be, for example, that the use character is recovered in predetermined facilities placed in a game field, or that a predetermined recovery item is given to the use character.

In the exemplary embodiment, regarding damage from an attack to be received by a character in the transformed state, the damage is calculated by applying the transformed type (i.e., without applying the normal type), whereas regarding an attack to be made by the character in the transformed state, the offensive strength (and damage based on the offensive strength) is calculated by applying both the normal type and the transformed type. Here, if, regarding the attack to be made by the character in the transformed state, the offensive strength is calculated applying only the transformed type (specifically, the offensive strength of only an attack of a type that matches the transformed type is increased), the advantage of using an attack of a type that matches the normal type may decrease after the transformation, and options for the attack may substantially narrow. In the exemplary embodiment, as described above, since there is an upper limit to the categories of attacks that can be used by a character, if the options for the attack narrow, there is a possibility that the level of strategy in the competitive game decreases. Based on the above, in the exemplary embodiment, regarding the attack to be made by the character in the transformed state, the offensive strength is calculated taking into account both the normal type and the transformed type, thereby preventing the options for the attack from narrowing after the transformation (according to the exemplary embodiment, the options for the attack rather widen after the transformation). Thus, it is possible to reduce the above possibility.

In the exemplary embodiment, in a case where each character enters a transformed state, the character can use the above special attack that changes to a type that matches a transformed type. That is, in a case where a character changes from the normal state to the transformed state, the game system 1 performs control to change the type of the special attack in the categories of attacks set for the character to a type that matches the transformed type. Based on this, a character capable of using the special attack can make an attack of a type that matches the transformed type after the transformation. Thus, the character can make an attack taking advantage of the transformation. Thus, for example, even in a case where the categories of attacks that can be set as attacks that can be used by a character do not include the category of an attack of a type that matches the transformed type of the character, the character can make an attack of a type that matches the transformed type after the transformation, using the above special attack.

In the exemplary embodiment, the above special attack can be used also in a case where a character is in the normal state. In another exemplary embodiment, the special attack may be able to be used in a case where a character is in the transformed state, and may not be able to be used in a case where the character is in the normal state. For example, in a case where a character is in the normal state, attacks in a predetermined number of categories can be used. In a case where the character enters the transformed state, the special attack may be able to be used in addition to the attacks in the predetermined number of categories.

[3. Specific Example of Processing in Game System]

Figure 13:
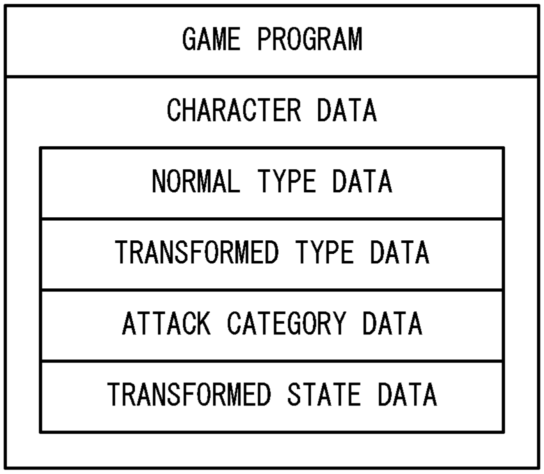
FIG. 13 is a diagram showing examples of various pieces of data used in information processing in a non-limiting game system.
Figure 14:
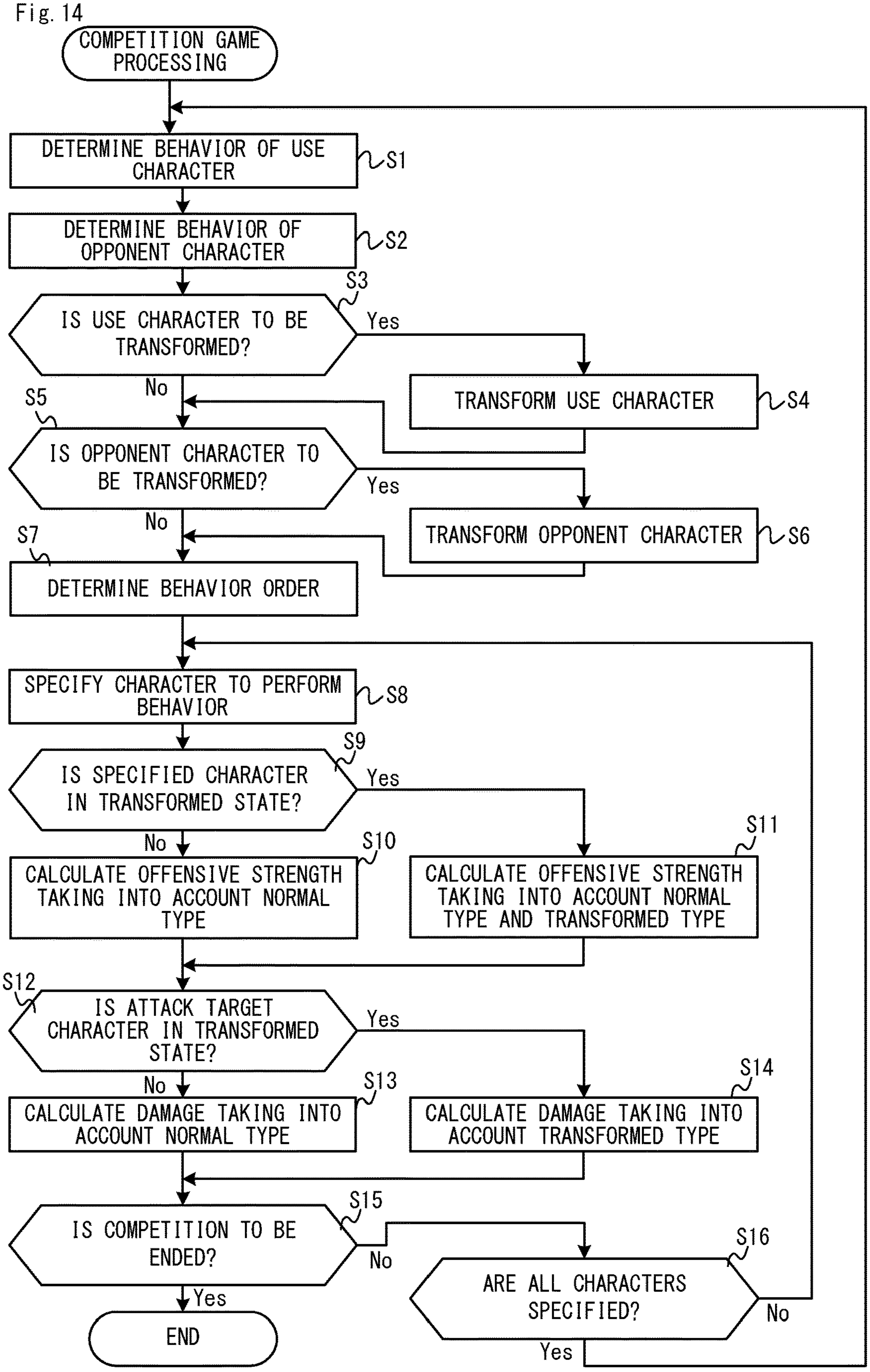
FIG. 14 is a flow chart showing an example of the flow of competitive game processing executed by the non-limiting game system.

Next, with reference to FIGS. 13 and 14, a description is given of a specific example of the information processing in the game system 1.

FIG. 13 is a diagram showing examples of various pieces of data used for the information processing in the game system 1. The various pieces of data shown in FIG. 13 are stored in a storage medium (e.g., the flash memory 84, the DRAM 85, a memory card attached to the slot 23, and/or the like) accessible by the main body apparatus 2.

As shown in FIG. 13, the game system 1 stores a game program. The game program is a game program for executing game processing according to the exemplary embodiment (specifically, competitive game processing shown in FIG. 14).

The game system 1 also stores character data indicating various pieces of information regarding a character (i.e., a use character or an opponent character). In the exemplary embodiment, the character data includes normal type data, transformed type data, attack category data, and transformed state data. The normal type data indicates the normal type set for the character. Since the normal type is set with respect to each kind of characters in the exemplary embodiment, the game system 1 may not store the normal type data with respect to each individual character. The transformed type data indicates the transformed type set for the character. The attack category data indicates the categories and the types of attacks set as attacks that can be used by the character. The transformed state data indicates whether the character is currently in the normal state or in the transformed state. At the start of competitive game processing, the above transformed state data indicates the normal state. The character data includes data indicating various parameters (e.g., the level, the hit point, the quickness, and the like) set for the character in addition to the above data. The character data is stored with respect to each character that appears in the competition scene.

FIG. 14 is a flow chart showing an example of the flow of competitive game processing executed by the game system 1. The competitive game processing is game processing executed in the competition scene during the game. The competitive game processing is started, for example, in accordance with the start of the competition scene (e.g., the state where a player character encounters an enemy character in a game field) during the execution of the above game program.

In the exemplary embodiment, the description is given on the assumption that the processes of steps shown in FIG. 14 are executed by the processor 81 of the main body apparatus 2 executing the game program stored in the game system 1. In another exemplary embodiment, however, some of the processes of the above steps may be executed by a processor (e.g., a dedicated circuit or the like) different from the processor 81. Further, in a case where the game system 1 can communicate with another information processing apparatus (e.g., a server), some of the processes of the steps shown in FIG. 14 may be executed by the other information processing apparatus. The processes of all of the steps shown in FIG. 14 are merely illustrative. Thus, the processing order of the steps may be changed, or another process may be performed in addition to (or instead of) the processes of all of the steps, so long as similar results are obtained.

The processor 81 executes the processes of the steps shown in FIG. 14, using a memory (e.g., the DRAM 85). That is, the processor 81 stores information (in other words, data) obtained by each processing step in the memory. To use the information in the subsequent processing steps, the processor 81 reads the information from the memory and uses the read information.

In the competitive game processing shown in FIG. 14, processing in the processing loop of steps S1 to S16 is executed once in a single turn in the competition scene. When the turn is repeated in the competition scene, the processing loop of steps S1 to S16 is repeatedly executed. Although not shown in FIG. 14, in the series of processes of steps S1 to S16, the processor 81 generates and displays a game image at an appropriate timing. Based on this, a game image as shown in FIGS. 8 and 9 is displayed, or the game image is updated, whereby an animation in which each character performs an attack action is displayed. The game image may be displayed on the display 12, or may be displayed on the above stationary monitor.

In step S1 shown in FIG. 14, among the attack categories indicated by the attack category data included in the character data regarding the use character that is stored in the memory, the processor 81 determines the category of an attack to be made by the use character. As described above, the category of the attack to be made by the use character is determined by an instruction from the player. Specifically, the processor 81 displays a game image including attack instruction images indicating the attack categories indicated by the above attack category data and receives an instruction to select one of the attack instruction images. The processor 81 acquires operation data received from the controllers via the controller communication section 83 and/or the terminals 17 and 21, and based on the acquired operation data, identifies the attack instruction image selected by the player. The processor 81 determines the attack category indicated by the identified attack instruction image as the category of the attack to be made by the use character.

In the above step S1, the processor 81 receives a transformation instruction to transform the use character. Specifically, in the state where a game image including the above transformation instruction image 215 is displayed, the processor 81 receives an instruction to specify the transformation instruction image 215 (i.e., a transformation instruction), and based on the above operation data, determines whether or not the instruction is given. When the use character in the transformed state is present, the processor 81 does not display the transformation instruction image 215 and receive the transformation instruction. In addition to the above instruction, for example, when a plurality of opponent characters are present, the processor 81 may further receive an instruction to specify an opponent character as a target of the attack to be made by the use character. After step S1, the process of step S2 is executed.

In step S2, among the attack categories indicated by the attack category data included in the character data regarding the opponent character that is stored in the memory, the processor 81 determines the category of an attack to be made by the opponent character. As described above, the opponent character may be operated by another player different from the player who uses the use character, or may be a character of which the behavior is controlled by the game system 1. When the opponent character is operated by the above other player, the processor 81 acquires an instruction given by the other player, and based on the instruction, determines the category of the attack to be made by the opponent character. When the above other player uses the controllers of the game system 1, the processor 81 determines the above instruction based on operation data transmitted from the controllers. When the above other player uses an apparatus different from that of the game system 1, the processor 81 acquires data indicating the above instruction from the apparatus, for example, via the network communication section 82. When the opponent character is a character of which the behavior is controlled by the game system 1, the processor 81 determines the category of the attack to be made by the opponent character in accordance with an algorithm determined by the game program.

In the above step S2, the processor 81 determines whether or not to transform the opponent character. Specifically, when the opponent character is operated by the above other player, the processor 81 acquires an instruction to transform the opponent character, and based on the instruction, determines whether or not to transform the opponent character. When the opponent character is a character of which the behavior is controlled by the game system 1, in accordance with an algorithm determined by the game program, the processor 81 determines whether or not to transform the opponent character. After step S2, the process of step S3 is executed.

In step S3, the processor 81 determines whether or not to transform the use character. That is, the processor 81 determines whether or not the player gives the transformation instruction to transform the use character in the above step S1. When the result of the determination in step S3 is affirmative, the process of step S4 is executed. When, on the other hand, the result of the determination in step S3 is negative, the process of step S4 is skipped, and the process of step S5 is executed.

In step S4, the processor 81 brings the use character into the transformed state. That is, in the displayed game image, the processor 81 changes the external appearance of the use character to a representation of the transformed state. The processor 81 updates the transformed state data included in the character data regarding the use character to a content indicating the transformed state. When the character data includes attack category data indicating the special attack, the processor 81 updates the attack category data so that the type of the special attack is the same type as the transformed type of the use character. After step S4, the process of step S5 is executed.

In step S5, the processor 81 determines whether or not to transform the opponent character. That is, the processor 81 determines whether or not it is determined in the above step S2 that the opponent character is to be transformed. When the result of the determination in step S5 is affirmative, the process of step S6 is executed. When, on the other hand, the result of the determination in step S5 is negative, the process of step S6 is skipped, and the process of step S7 is executed.

In step S6, the processor 81 brings the opponent character into the transformed state. That is, in the displayed game image, the processor 81 changes the external appearance of the opponent character to a representation of the transformed state. The processor 81 updates the transformed state data included in the character data regarding the opponent character to a content indicating the transformed state. When the character data includes attack category data indicating the special attack, the processor 81 updates the attack category data so that the type of the special attack is the same type as the transformed type of the opponent character. After step S6, the process of step S7 is executed.

In step S7, the processor 81 determines the behavior order of the use character and the opponent character. The specific method for determining the behavior order is any method. For example, the processor 81 references predetermined parameters (e.g., the quickness) regarding the use character and the opponent character, and based on the parameters, determines the behavior order. After step S7, the process of step S8 is executed.

In step S8, the processor 81 specifies a single character between the use character and the opponent character in accordance with the behavior order determined in step S7. That is, the processor 81 specifies the earliest character in the behavior order among characters that have not yet been specified in step S8 in the current turn (i.e., the processing loop of steps S1 to S16). After step S8, the process of step S9 is executed.

In step S9, based on the transformed state data regarding the character specified in step S8 that is stored in the memory, the processor 81 determines whether or not the character is in the transformed state. When the result of the determination in step S9 is negative, the process of step S10 is executed. When, on the other hand, the result of the determination in step S9 is affirmative, the process of step S11 is executed.

In step S10, the processor 81 references the normal type data regarding the character specified in step S8, and based on the normal type of the character, calculates the offensive strength of the attack to be made by the character. Specifically, the processor 81 references the attack category data regarding the character specified in step S8, and based on the category of the attack to be made by the character and whether or not the type of the attack matches the normal type of the character, calculates the offensive strength of the attack. That is, as described in the above "[2. Overview of Processing in Game System]", in a case where the type of the attack matches the normal type of the character, the processor 81 sets the offensive strength of the attack to 1.5 times as much as the reference value. In a case where the type of the attack does not match the normal type of the character, the processor 81 sets the offensive strength of the attack to the reference value (see FIGS. 10 and 11). After step S10, the process of step S12 is executed.

On the other hand, in step S11, the processor 81 references the normal type data and the transformed type data regarding the character specified in step S8, and based on the normal type and the transformed type of the character, calculates the offensive strength of the attack to be made by the character. Specifically, the processor 81 references the attack category data regarding the character specified in step S8, and based on the category of the attack to be made by the character and whether or not the type of the attack matches the normal type and/or the transformed type of the character, calculates the offensive strength of the attack. That is, as described in the above "[2. Overview of Processing in Game System]", in a case where the type of the attack matches the normal type or the transformed type of the character, the processor 81 sets the offensive strength of the attack to 1.5 times as much as the reference value. In a case where the type of the attack matches both the normal type and the transformed type, the processor 81 sets the offensive strength of the attack to 2 times as much as the reference value. In a case where the type of the attack does not match either of the normal type and the transformed type, the processor 81 sets the offensive strength of the attack to the reference value (see FIGS. 10 and 11). After step S11, the process of step S12 is executed.

In step S12, based on the transformed state data regarding an attack target character as a target of the attack to be made by the character specified in step S8 that is stored in the memory, the processor 81 determines whether or not the attack target character is in the transformed state. When the result of the determination in step S12 is negative, the process of step S13 is executed. When, on the other hand, the result of the determination in step S12 is affirmative, the process of step S14 is executed.

In step S13, the processor 81 calculates damage to be inflicted on the attack target character by the attack to be made by the character specified in step S8, taking into account the normal type of the attack target character. That is, based on the type indicated by the normal type data regarding the above attack target character that is stored in the memory, the processor 81 calculates the damage to be inflicted on the attack target character. Specifically, as described in the above "[2. Overview of Processing in Game System]", in accordance with whether the type of the made attack has an advantage, an average relationship, or a disadvantage over the normal type of the attack target character, the processor 81 determines whether to set the damage to be inflicted to 2 times, 1 time, or 0.5 times as much as the reference damage value (see FIG. 12). After step S13, the process of step S15 is executed.

In step S14, the processor 81 calculates damage to be inflicted on the attack target character by the attack to be made by the character specified in step S8, taking into account the transformed type of the attack target character. That is, based on the type indicated by the transformed type data regarding the above attack target character that is stored in the memory, the processor 81 calculates the damage to be inflicted on the attack target character. Specifically, as described in the above "[2. Overview of Processing in Game System]", in accordance with whether the type of the made attack has an advantage, an average relationship, or a disadvantage over the transformed type of the attack target character, the processor 81 determines whether to set the damage to be inflicted to 2 times, 1 time, or 0.5 times as much as the reference damage value (see FIG. 12). After step S14, the process of step S15 is executed.

In the process of the above step S13 or S14, the processor 81 also executes the process of inflicting the determined damage on the character (e.g., the process of subtracting a value relating to the damage from the hit point value). The processor 81 also causes the character specified in step S8 to perform an action according to the attack and generates and displays a game image representing the state where the character performs the action.

In step S15, the processor 81 determines whether or not to end the competition in the current competition scene (i.e., the competitive game processing). The specific determination method in step S15 is any method. For example, when the hit point value of either of the characters becomes 0 by the process of the above step S13 or S14, it is determined that the competition is to be ended. When neither of the hit point values of the characters become 0, it is determined that the competition is not to be ended. When the result of the determination in step S15 is negative, the process of step S16 is executed. When, on the other hand, the result of the determination in step S15 is affirmative, the processor 81 ends the competitive game processing shown in FIG. 14.

In step S16, the processor 81 determines whether or not all the characters are specified in step S8. When the result of the determination in step S16 is negative, the process of the above step S8 is executed again. At this time, the process of step S8 is performed again, thereby specifying a character that has not yet made an attack in the current turn. When, on the other hand, the result of the determination in step S16 is affirmative, the process of the above step S1 is executed again. At this time, the current turn ends, and the next turn is performed.

[4. Operation and Effect and Variations of Exemplary Embodiment]

As described above, in the above exemplary embodiment, the game program causes a computer of an information processing apparatus (as an example, the main body apparatus 2) to execute competitive game processing for causing a plurality of characters including a use character used by a player and an opponent character as an opponent of the use character to compete against each other in a virtual space (FIG. 14). For each of the plurality of characters, at least (a) a kind of the character, (b) at least one first type (as an example, a normal type) associated with the kind of the character, (c) a second type (as an example, a transformed type) individually set with respect to each character, and (d) categories of attacks which can be used by the character in a competition and with which a third type is associated are set. The game program is configured to cause the computer (as an example, the processor 81) to perform the following processes in the competitive game processing.

- The process of performing control to, in a case where a predetermined condition is satisfied, change a state of a character satisfying the condition from a first state to a second state (steps S4 and S6)
- The process of controlling the use character to, among the categories of the attacks that can be used by the use character, make an attack in a category indicated based on an operation input provided by the player, and calculating damage of the opponent character from the attack (steps S10, S11, S13, and S14)
- The process of, based on an attack of the opponent character, calculating damage of the use character from the attack (steps S10, S11, S13, and S14)
- The process of, in a case where the character having made the attack is in the first state, and in a case where the third type set for the made attack matches the first type set for the character having made the attack, increasing damage from the attack compared to a case where the third type does not match the first type (step S10)

The process of, in a case where the character having made the attack is in the second state, and in a case where the third type set for the made attack matches at least either of the first type and the second type set for the character having made the attack, increasing damage from the attack compared to a case where the third type does not match either of the first type and the second type (step S11)

The process of, in a case where the character having received the attack is in the first state, and in a case where a combination of the third type set for the made attack and the first type set for the character having received the attack is a predetermined combination determined based on a predetermined rule, increasing or decreasing damage from the attack compared to a case where the combination is not the predetermined combination (step S13)

The process of, in a case where the character having received the attack is in the second state, and in a case where a combination of the third type set for the made attack and the second type set for the character having received the attack is a predetermined combination determined based on the predetermined rule, increasing or decreasing damage from the attack compared to a case where the combination is not the predetermined combination (step S14)

According to the above configuration, a character changes from the first state to the second state, whereby damage from an attack of the character changes, or damage to be received by the character changes. Based on this, in a competition, it is possible to create tactics for the selection of the timing when a character is changed and the category of an attack to be made by the character. Thus, it is possible to improve the level of strategy in a competitive game. Two types, namely the first type and the second type, are set for each character. Thus, it is possible to increase the variations of characters compared to a case where a single type is set.

The above "predetermined rule" is, for example, a rule for defining the advantage/disadvantage relationship between types in the above exemplary embodiment. The above "predetermined combination determined based on the predetermined rule" is, for example, a combination of a certain type and another type having an advantage or a disadvantage over the certain type in the above exemplary embodiment. The above predetermined rule may be any rule for defining a combination of types for increasing or decreasing damage from an attack. The predetermined rule may be, for example, a rule for defining a magnification by which damage is multiplied with respect to each combination of types.

In the above exemplary embodiment, when a process is executed by a certain information processing apparatus using data (including a program), a part of data necessary for the process may be transmitted from another information processing apparatus different from the certain information processing apparatus. At this time, the certain information processing apparatus may execute the above process using the data received from the other information processing apparatus and data stored in the certain information processing apparatus.

In another exemplary embodiment, an information processing system may not include a part of the configuration in the above exemplary embodiment, and may not execute a part of the process executed in the above exemplary embodiment. For example, to achieve a particular effect of a part of the above exemplary embodiment, the information processing system may only need to include a configuration for achieving the effect and execute a process for achieving the effect, and may not include another configuration, and may not execute another process.

The above exemplary embodiment can be used for, for example, a game system and a game program in order, for example, to improve the level of strategy in a competitive game and increase the variations of characters.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein a game program, the game program causing a processor of an information processing apparatus to provide execution comprising:

executing competitive game processing for causing a plurality of characters including a use character used by a player and an opponent character as an opponent of the use character to compete against each other in a virtual space, wherein for each of the plurality of characters, at least the following are set:

a kind of the character;

at least one first type associated with each kind of the character;

a second type individually set with respect to each character; and categories of attacks which can be used by the character in a competition and with which a third type is associated, the game program causing the processor to provide further execution that comprises:

performing control to, in a case where a predetermined condition is satisfied, change a state of a character, including the use character it character, satisfying the condition from a first state to a second state;

controlling the use character to, among the categories of the attacks that can be used by the use character, make an attack in a category indicated based on an operation input provided by the player, and calculating damage of the opponent character from the attack made by the use character;

based on an attack of the opponent character, calculating damage of the use character from the attack opponent character;

in a case where the character, including the use character of the opponent character, having made the attack is in the first state, and in a case where the third type set for the made attack matches the first type set for the character having made the attack, increasing damage from the attack compared to a case where the third type does not match the first type;

in a case where the character, including the use character of the opponent character, having made the attack is in the second state, and in a case where the third type set for the made attack matches at least either of the first type and the second type set for the character having made the attack, increasing damage from the attack compared to a case where the third type not match either of the first type and the second type;

in a case where the character, including the use cha e opponent character, having received the attack is in the first state, and in a case where a combination of the third type set for the made attack and the first type set for the character having received the attack is a predetermined combination determined based on a predetermined rule, increasing or decreasing damage from the attack compared to a case where the combination is not the predetermined combination; and in a case where the character, including the use character or the opponent character, having received the attack is in the second state, and in a case where a combination of the third type set for the made attack and the second type set for the character having received the attack is a predetermined combination determined based on the predetermined rule, increasing or decreasing damage from the attack compared to a case where the combination is not the predetermined combination.

2. The storage medium according to claim 1, wherein the game program further causing the processor to provide execution comprising:

controlling the use character and the opponent character to each perform a behavior once in each turn; and performing control to, in a case where the predetermined condition is satisfied in a certain turn, and before the use character and the opponent character each perform a behavior in the turn, change the state of the character satisfying the condition from the first state to the second state.

3. The storage medium according to claim 2, wherein the game program further causing the processor to provide execution comprising:

performing control to, in accordance with an instruction based on an operation input provided by the player, change a state of the use character from the first state to the second state.

4. The storage medium according to claim 3, wherein the competitive game processing is for causing a plurality of the use characters and a plurality of the opponent characters to compete against each other, and an instruction to change the use character from the first state to the second state is received only once during a competition by the competitive game processing.

5. The storage medium according to claim 1, wherein the game program further causing the processor to provide execution comprising:

in a case where the character having made the attack is in the second state, and in a case where the third type set for the made attack matches both the first type and the second type set for the character having made the attack, increasing damage from the attack more than in a case where the third type matches only one of the first type and the second type.

6. The storage medium according to claim 1, wherein the game program further causes the processor to provide execution comprising:

performing control to, in a case where the character changes from the first state to the second state, change the third type of an attack in a predetermined category among the categories of the attacks set for the character to a type that matches the second type.

7. An information processing system, comprising:

a processor; and a memory configured to store computer instructions that, when executed by the processor, cause the information processing system to:

execute competitive game processing for causing a plurality of characters including a use character used by a player and an opponent character as an opponent to compete against each other in a virtual space, wherein for each of the plurality of characters, at least the following are set:

a kind of the character;

at least one first type associated with the kind of the character;

a second type individually set with respect to each character; and categories of attacks which can be used by the character in a competition and with which a third type is associated, the system is further caused to:

in a case where a predetermined condition is satisfied, change a state of a character, including the use character of the opponent character, satisfying the condition from a first state to a second state;

cause the use character to, among the categories of the attacks that can be used by the use character, make an attack in a category indicated based on an operation input provided by the player, and calculate damage of the opponent character from the attack made by the use character;

based on an attack of the opponent character, calculate damage of the use character from the attack made by the opponent character;

in a case where the character, including the use character or the opponent character, having made the attack is in the first state, and in a case where the third type set for the made attack matches the first type set for the character having made the attack, increase damage from the attack compared to a case where the third type does not match the first type;

in a case where the character, including the use character of the opponent character, having made the attack is in the second state, and in a case where the third type set for the made attack matches at least either of the first type and the second type set for the character having made the attack, increase damage from the attack compared to a case where the third type not match either of the first type and the second type;

in a case where the character, including the use character or the opponent character, having received the attack is in the first state, and in a case where a combination of the third type set for the made attack and the first type set for the character having received the attack is a predetermined combination determined based on a predetermined rule, increase or decrease damage from the attack compared to a case where the combination is not the predetermined combination; and in a case where the character, including the use character or the opponent character, having received the attack is in the second state, and in a case where a combination of the third type set for the made attack and the second type set for the character having received the attack is a predetermined combination determined based on the predetermined rule, increase or decrease damage from the attack compared to a case where the combination is not the predetermined combination.

8. The information processing system according to claim 7, wherein the system is further caused to:

cause the use character and the opponent character to each perform a behavior once in each turn; and in a case where the predetermined condition is satisfied in a certain turn, and before the use character and the opponent character each perform a behavior in the turn, change the state of the character satisfying the condition from the first state to the second state.

9. The information processing system according to claim 8, wherein the system is further caused to:

in accordance with an instruction based on an operation input provided by the player, change a state of the use character from the first state to the second state.

10. The information processing system according to claim 9, wherein the competitive game processing is for causing a plurality of the use characters and a plurality of the opponent characters to compete against each other, and an instruction to change the use character from the first state to the second state is received only once during a competition by the competitive game processing.

11. The information processing system according to claim 7, wherein the system is further caused to:

in a case where the character having made the attack is in the second state, and in a case where the third type set for the made attack matches both the first type and the second type set for the character having made the attack, increase damage from the attack more than in a case where the third type matches only one of the first type and the second type.

12. The information processing system according to claim 7, wherein the system is further caused to:

perform control to, in a case where the character changes from the first state to the second state, change the third type of an attack in a predetermined category among the categories of the attacks set for the character to a type that matches the second type.

13. An information processing apparatus, comprising:

processing circuitry including a processor, wherein the processing circuitry is configured to:

execute competitive game processing for causing a plurality of characters including a use character used by a player and an opponent character as an opponent to compete against each other in a virtual space, wherein for each of the plurality of characters, at least the following are set:

a kind of the character;

at least one first type associated with the kind of the character;

a second type individually set with respect to each character; and categories of attacks which can be used by the character in a competition and with which a third type is associated, the processing circuitry is further configured to:

in a case where a predetermined condition is satisfied, change a state of a character, including the use character be oppo character, satisfying the condition from a first state to a second state;

cause the use character to, among the categories of the attacks that can be used by the use character, make an attack in a category indicated based on an operation input provided by the player, and calculate damage of the opponent character from the attack made by the use character;

based on an attack of the opponent character, calculate damage of the use character from the attack made by e opponent character;

in a case where the character, including the use ponent character, having made the attack is in the first state, and in a case where the third type set for the made attack matches the first type set for the character having made the attack, increase damage from the attack compared to a case where the third type does not match the first type;

in a case where the character, including the use ponent character, having made the attack is in the second state, and in a case where the third type set for the made attack matches at least either of the first type and the second type set for the character having made the attack, increase damage from the attack compared to a case where the third type not match either of the first type and the second type;

in a case where the character, including the use character or the opponent character, having received the attack is in the first state, and in a case where a combination of the third type set for the made attack and the first type set for the character having received the attack is a predetermined combination determined based on a predetermined rule, increase or decrease damage from the attack compared to a case where the combination is not the predetermined combination; and in a case where the character, including the use character or the opponent character, having received the attack is in the second state, and in a case where a combination of the third type set for the made attack and the second type set for the character having received the attack is a predetermined combination determined based on the predetermined rule, increase or decrease damage from the attack compared to a case where the combination is not the predetermined combination.

14. The information processing apparatus according to claim 13, wherein the processing circuitry is further configured to:

cause the use character and the opponent character to each perform a behavior once in each turn; and in a case where the predetermined condition is satisfied in a certain turn, and before the use character and the opponent character each perform a behavior in the turn, change the state of the character satisfying the condition from the first state to the second state.

15. The information processing apparatus according to claim 14, wherein the processing circuitry is further configured to:

in accordance with an instruction based on an operation input provided by the player, change a state of the use character from the first state to the second state.

16. The information processing apparatus according to claim 15, wherein the competitive game processing is for causing a plurality of the use characters and a plurality of the opponent characters to compete against each other, and an instruction to change the use character from the first state to the second state is received only once during a competition by the competitive game processing.

17. The information processing apparatus according to claim 13, wherein the processing circuitry is farther configured to:

in a case where the character having made the attack is in the second state, and in a case where the third type set for the made attack matches both the first type and the second type set for the character having made the attack, increase damage from the attack more than in a case where the third type matches only one of the first type and the second type.

18. The information processing apparatus according to claim 13, wherein the processing circuitry is further configured to:

perform control to, in a case where the character changes from the first state to the second state, change the third type of an attack in a predetermined category among the categories of the attacks set for the character to a type that matches the second type.

19. A game processing method executed by an information processing system, the method comprising:

executing competitive game processing for causing a plurality of characters including a use character used by a player and an opponent character as an opponent to compete against each other in a virtual space, wherein for each of the plurality of characters, at least the following are set:

a kind of the character;

at least one first type associated with the kind of the character;

a second type individually set with respect to each character; and categories of attacks which can be used by the character in a competition and with which a third type is associated, the method further comprises:

in a case where a predetermined condition is satisfied, changing a state of a character, including the use character of the opponent character satisfying the condition from a first state to a second state;

causing the use character to, among the categories of the attacks that can be used by the use character, making an attack in a category indicated based on an operation input provided by the player, and calculating damage of the opponent character from the attack made by the use character;

based on an attack of the opponent character, calculating damage of the use character from the attack made by the opponent character;

in a case where the character, including the use character of the opponent character, having made the attack is in the first state, and in a case where the third type set for the made attack matches the first type set for the character having made the attack, increasing damage from the attack compared to a case where the third type does not match the first type;

in a case where the character, including the use character or the opponent character, having made the attack is in the second state, and in a case where the third type set for the made attack matches at least either of the first type and the second type set for the character having made the attack, increasing damage from the attack compared to a case where the third type not match either of the first type and the second type;

in a case where the character, including the use character of the opponent character having received the attack is in the first state, and in a case where a combination of the third type set for the made attack and the first type set for the character having received the attack is a predetermined combination determined based on a predetermined rule, increasing or decreasing damage from the attack compared to a case where the combination is not the predetermined combination; and in a case where the character, including the use character or the opponent character, having received the attack is in the second state, and in a case where a combination of the third type set for the made attack and the second type set for the character having received the attack is a predetermined combination determined based on the predetermined rule, increasing or decreasing damage from the attack compared to a case where the combination is not the predetermined combination.

20. The game processing method according to claim 19, further comprising:

causing the use character and the opponent character to each perform a behavior once in each turn; and in a case where the predetermined condition is satisfied in a certain turn, and before the use character and the opponent character each perform a behavior in the turn, changing the state of the character satisfying the condition from the first state to the second state.

21. The game processing method according to claim 20, further comprising:

in accordance with an instruction based on an operation input provided by the player, changing a state of the use character from the first state to the second state.

22. The game processing method according to claim 21, wherein the competitive game processing is for causing a plurality of the use characters and a plurality of the opponent characters to compete against each other, and an instruction to change the use character from the first state to the second state is received only once during a competition by the competitive game processing.

23. The game processing method according to claim 19, further comprising:

in a case where the character having made the attack is in the second state, and in a case where the third type set for the made attack matches both the first type and the second type set for the character having made the attack, increasing damage from the attack more than in a case where the third type matches only one of the first type and the second type.

24. The game processing method according to claim 19, further comprising:

performing control to, in a case where the character changes from the first state to the second state, change the third type of an attack in a predetermined category among the categories of the attacks set for the character to a type that matches the second type.

* * * * *